(12) United States Patent
Nishino et al.

(10) Patent No.: US 11,870,321 B2
(45) Date of Patent: Jan. 9, 2024

(54) MOTOR

(71) Applicant: MINEBEA MITSUMI Inc., Nagano (JP)

(72) Inventors: Hirotake Nishino, Kitasaku-gun (JP); Takayuki Yamasaki, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 250 days.

(21) Appl. No.: 17/285,642

(22) PCT Filed: Sep. 13, 2019

(86) PCT No.: PCT/JP2019/036057
§ 371 (c)(1),
(2) Date: Apr. 15, 2021

(87) PCT Pub. No.: WO2020/090249
PCT Pub. Date: May 7, 2020

(65) Prior Publication Data
US 2021/0391766 A1  Dec. 16, 2021

(30) Foreign Application Priority Data
Oct. 29, 2018  (JP) .................. 2018-202562

(51) Int. Cl.
*H02K 5/24* (2006.01)
*H02K 7/08* (2006.01)
(52) U.S. Cl.
CPC .............. *H02K 5/24* (2013.01); *H02K 7/083* (2013.01)

(58) Field of Classification Search
CPC .......... H02K 5/24; H02K 7/083; H02K 7/085; H02K 7/086; H02K 7/088
USPC ........................................... 310/51, 90
See application file for complete search history.

(56) References Cited

U.S. PATENT DOCUMENTS

| 5,246,215 A | 9/1993 | Takamura et al. |
| 6,356,004 B1 | 3/2002 | Porter et al. |
| 2005/0238274 A1 | 10/2005 | Zernikow et al. |
| 2007/0257569 A1 | 11/2007 | Heyder |
| 2009/0108712 A1* | 4/2009 | Holtzapple .......... H02K 21/125 310/156.01 |

(Continued)

FOREIGN PATENT DOCUMENTS

| JP | S58-20972 A | 2/1983 |
| JP | S62-205712 A | 9/1987 |
| JP | 3-20131 A | 1/1991 |

(Continued)

OTHER PUBLICATIONS

Notice of Reasons for Refusal dated May 17, 2022 for corresponding Japanese Application No. 2020-554804 and English translation.

(Continued)

*Primary Examiner* — Terrance L Kenerly
(74) *Attorney, Agent, or Firm* — Pearne & Gordon LLP

(57) ABSTRACT

A motor according to an embodiment includes a shaft as a rotation axis, a rotor, a bearing, and a spring member. The rotor is fixed to the shaft. The bearing is disposed opposite to the rotor in the rotation axis direction and rotatably supports the shaft. The spring member is disposed between the rotor and the bearing and includes a first end portion fixed to the rotor.

7 Claims, 17 Drawing Sheets

(56) References Cited

U.S. PATENT DOCUMENTS

2015/0275962 A1 10/2015 Sakon et al.
2022/0381319 A1* 12/2022 Miller ..................... H02K 5/24

FOREIGN PATENT DOCUMENTS

| JP | H05-30701 A | 2/1993 |
| JP | H07-231609 A | 8/1995 |
| JP | 2006-511185 A | 3/2006 |
| JP | 2008-511278 A | 4/2008 |
| JP | 2011-244595 A | 12/2011 |
| WO | 2014/054236 A1 | 4/2014 |

OTHER PUBLICATIONS

English translation of the Written Opinion for corresponding International Application No. PCT/JP2019/036057 dated Apr. 27, 2021.
International Search Report for corresponding International Application No. PCT/JP2019/036057 dated Dec. 10, 2019.
Written Opinion for corresponding International Application No. PCT/JP2019/036057 dated Dec. 10, 2019.

* cited by examiner

MOTOR

TECHNICAL FIELD

The present invention relates to a motor.

BACKGROUND ART

Conventionally, various motors such as brushless motors have been proposed. In addition, in such various motors, there are vehicle-mounted motors disposed in an engine room of a vehicle. Furthermore, in such vehicle-mounted motors, there is a vehicle-mounted motor including a shaft provided with a spring for pressing a rotor against a bearing, for example.

CITATION LIST

Patent Literature

Patent Document 1: JP 2011-244595 A

SUMMARY OF INVENTION

Technical Problem

Various vibrations are generated in an engine of a vehicle. Examples of such vibrations include vibration with a constant frequency (a so-called sine wave) due to reciprocation of a piston and vibration with an irregular frequency (a so-called random wave) due to a push-up force resulting from irregularities on a road during traveling.

Such vibrations cause an uncontrollable motion of a spring for pressing a rotor, so that so-called surging occurs, and the spring comes into contact with an outer surface of a shaft. This accelerates wear of the shaft.

In light of the foregoing, an object of the present invention is to provide a motor capable of suppressing wear of a shaft.

Solution to Problem

To solve the problems described above and achieve an object, a motor according to an aspect of the present invention includes a shaft as a rotation axis, a rotor, a bearing, and a spring member. The rotor is fixed to the shaft. The bearing is disposed opposite to the rotor in a direction of the rotation axis and rotatably supports the shaft. The spring member is disposed between the rotor and the bearing and includes a first end portion fixed to the rotor.

According to one aspect of the present invention, wear of a shaft can be suppressed.

DESCRIPTION OF EMBODIMENTS

A motor according to an embodiment will be described below with reference to the drawings. Note that the present invention is not limited by embodiments described below. Below, a description proceeds with an example, and in the example, the motor is an inner rotor type brushless motor including a rotor disposed on an inner circumferential side of a stator, but the motor may be an outer rotor type brushless motor including the rotor disposed on an outer circumferential side of the stator. Note that a rotation axis direction being a Z-axis direction is referred to as "axial direction". "Surging" described below means a resonance generated at a predetermined frequency as a result of weakened force for pressing the rotor by a spring to cause an uncontrollable motion of the spring by vibration such as vibration with a constant frequency (a so-called sine wave) due to reciprocation of a piston and vibration with an irregular frequency (a so-called random wave) due to a push-up force resulting from irregularities on a road during traveling, for example.

Figure 1:
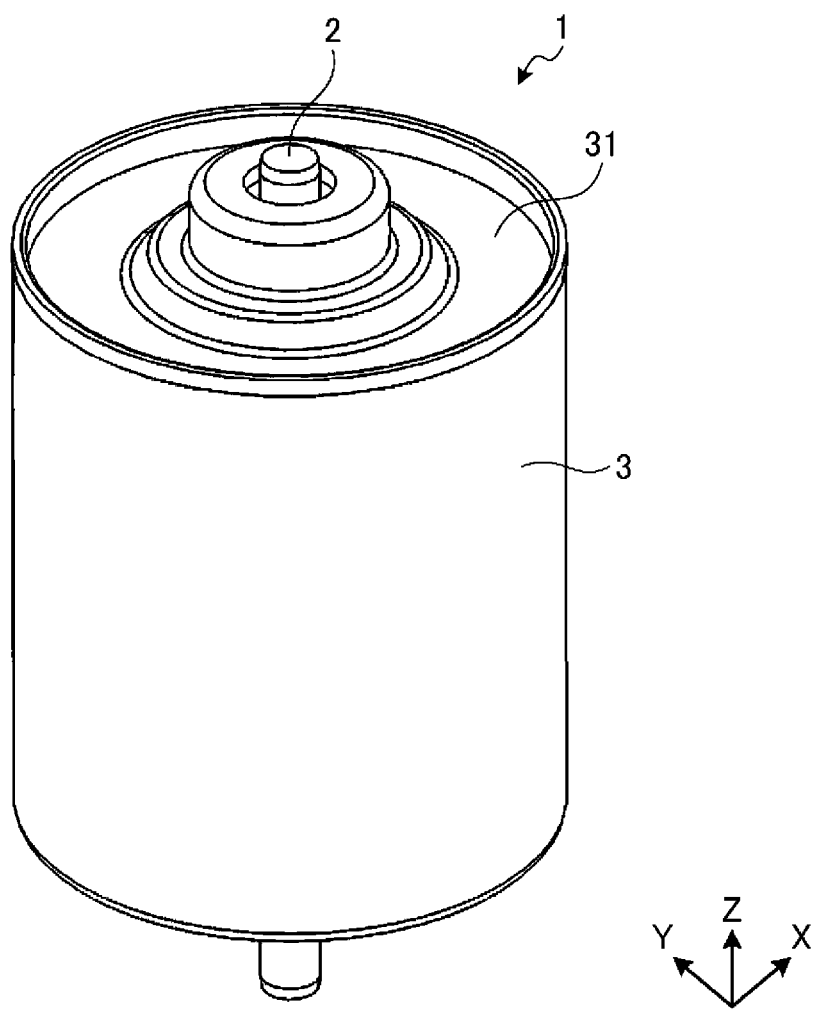
FIG. 1 is a perspective view illustrating an appearance of a motor according to an embodiment.

FIG. 1 is a perspective view illustrating an appearance of the motor according to the embodiment. As illustrated in FIG. 1, an overall shape of a motor 1 according to the embodiment is substantially tubular. Furthermore, in the motor 1, various members such as the rotor and the stator described below are covered by a housing 3 and a lid part 31. Furthermore, in the motor 1, a shaft 2 protrudes from the housing 3 and the lid part 31 in an axial direction being a Z-axis direction. Note that the motor 1 is provided with an external terminal (not illustrated), and power is supplied from outside via such an external terminal to rotate the shaft 2.

The motor 1 according to the embodiment includes a spring member 7 (see FIG. 2) described below inside the housing 3. The spring member 7 is disposed between a rotor 4 (see FIG. 2) and a second bearing 6b (see FIG. 2) described below, and a first end portion of the spring member 7 is fixed to the rotor 4. This can prevent an uncontrollable motion of the spring member 7 in a radial direction of the shaft 2, due to, for example, vibration of a vehicle, that is, this can suppress generation of surging and thus can suppress a contact between the spring member 7 and the shaft 2. Accordingly, in the motor 1 according to the embodiment, since the first end portion of the spring member 7 is fixed to the rotor 4, wear of the shaft 2 can be suppressed, and in particular, when the shaft 2 is formed of a metal member, generation of a metal wear can be suppressed. Furthermore, this can suppress a decrease of a rotational efficiency of the shaft 2 resulting from a metal powder generated by wear of the shaft 2 entering the second bearing 6b and the like, and in particular, this can prevent a case where a bearing is difficult to rotate due to a powder generated by the wear entering into the bearing.

Furthermore, the spring member 7 according to the embodiment has a substantially conical shape, and may also be configured to have a so-called irregular pitch, that is, a pitch of a wire rod (metal wire) configuring the spring member 7 may be uneven in the rotation axis direction. As a result, the generation of the surging can be further suppressed, and thus, the wear of the shaft 2 can be further suppressed. Note that spring member 7 described above will be described below in detail.

A configuration of the motor 1 will be described below in detail.

Figure 2:
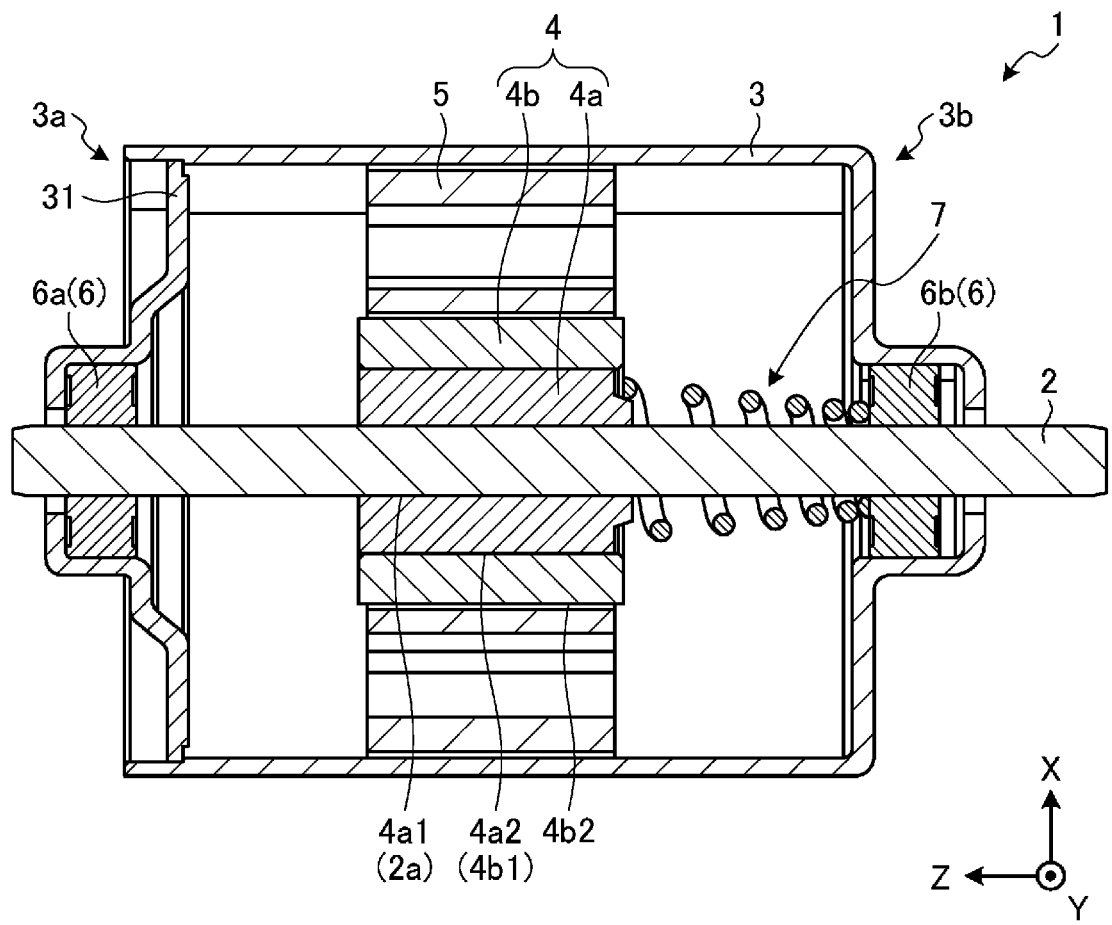
FIG. 2 is a cross-sectional view of the motor according to the embodiment.

FIG. 2 is a cross-sectional view of the motor 1 according to the embodiment. As illustrated in FIG. 2, the motor 1 includes the shaft 2 serving as the rotation axis, the housing 3, the rotor 4, the stator 5, the bearing 6, the spring member 7, and the lid part 31.

The shaft 2 is a rotation axis in the motor 1. A first end portion of the shaft 2 protrudes from the lid part 31, and a second end portion of the shaft 2 protrudes from a below-described bottom part 3b of the housing 3. That is, the shaft 2 is disposed through the motor 1 in the axial direction being the Z-axis direction. Furthermore, a power transmission mechanism such as a gear is connected to the first end portion of the shaft 2 on a positive side in the Z-axis direction, (or on a second end portion of the shaft 2 on a negative side in the Z-axis direction).

The housing 3 is a housing formed of a metal material such as iron or aluminum. In addition, the housing 3 has an opening 3a open on a first end portion side, that is, on the positive side in the Z-axis direction, and has the bottom part 3b closed on a second end portion side.

The lid part 31 is a lid covering the opening 3a of the housing 3 and is formed of a metal material such as iron and aluminum, or a hard resin material, for example. Note that a through hole for passing the shaft 2 is provided in the lid part 31.

The rotor 4 is a rotating body in the motor 1 and includes a yoke 4a and a magnet 4b. Furthermore, the rotor 4 is of a so-called inner rotor type and is disposed on an inner circumferential side of the stator 5. Note that the rotor 4 is not limited to the inner rotor type rotor, and may be of a so-called outer rotor type and be disposed on the outer circumferential side of the stator 5. In a case of an outer rotor type motor, the rotor includes a tubular yoke and an annular magnet attached to an outer surface or an inner surface of the yoke. The outer rotor type motor has a configuration with the stator disposed at the inside of the rotor.

The yoke 4a is a tubular iron core and is formed of a magnetic member, and an outer surface 2a of the shaft 2 is fixed to an inner surface 4a1 of the yoke 4a. Note that the yoke 4a and the shaft 2 may be fixed by bonding using an adhesive member, for example, or the shaft 2 may be press-fitted into the yoke 4a for fixation.

The magnet 4b is a tubular permanent magnet including an inner circumferential part 4b1 and an outer circumferential part 4b2, and the yoke 4a is fixed to the inner circumferential part 4b1. The magnet 4b may be a so-called bonded magnet formed of a resin member and a magnetic material or formed by disposing a plurality of magnets at an outer surface 4a2 of the yoke 4a. Note that the yoke 4a and the shaft 2 may be fixed by bonding using an adhesive member, for example, or the shaft 2 may be press-fitted into the yoke 4a for fixation.

Furthermore, a magnetic gap is formed between the outer circumferential part 4b2 of the magnet 4b and an inner circumferential part of the stator 5 in the radial direction of the motor 1. This allows the rotor 4 to rotate by a magnetic field generated in the stator 5.

The stator 5 is a tubular magnetic member and is formed of a plate-like metal member such as a soft magnetic steel plate, or a silicon steel plate or an electromagnetic steel plate, for example. Specifically, the stator 5 is formed by a plurality of these plate-like metal members being stacked in the axial direction of the shaft 2.

In addition, the stator 5 includes a plurality of teeth on the inner circumferential side of the stator 5. The plurality of teeth are wounded by coils (not illustrated). A magnetic gap is formed between the plurality of teeth and the magnet 4b. That is, in a case where an AC current supplied from outside sequentially flows through the coils wound around each of the teeth, the stator 5 forms a magnetic field for rotating the rotor 4.

The bearing 6 is, for example, a rolling bearing, and is disposed opposite to the rotor 4 in the axial direction of the shaft 2, and rotatably supports the shaft 2. In the present embodiment, the bearing 6 includes a first bearing 6a and the second bearing 6b. The shaft 2 described above is inserted into the first bearing 6a and the second bearing 6b. Specifically, the shaft 2 is press-fitted into the first bearing 6a. Furthermore, the shaft 2 is displaceably or slidably inserted into the second bearing 6b.

The first bearing 6a is disposed on a side of the lid part 31 with respect to the rotor 4 and is fixed to the lid part 31. Specifically, the first bearing 6a is fixed to the lid part 31 through adhesion or press-fitting. This can suppress shifting of a position of the first bearing 6a with respect to the housing 3 due to vibration of the vehicle or the like, for example.

The second bearing 6b is disposed on a side of the bottom part 3b of the housing 3 with respect to the rotor 4 and is fixed to the bottom part 3b. Specifically, the second bearing 6b is fixed to the bottom part 3b of the housing 3 through adhesion or press-fitting. This can suppress shifting of a position of the second bearing 6b with respect to the housing 3 due to vibration of the vehicle or the like, for example.

The spring member 7 is disposed between the rotor 4 and the second bearing 6b, and the first end portion of the spring member 7 is fixed to the rotor 4. Note that the spring member 7 may be disposed between the rotor 4 and the first bearing 6a. Thus, since the first end portion of the spring member 7 is fixed to the rotor 4 so that an uncontrollable motion of the spring member 7 due to vibration can be suppressed, a contact between the spring member 7 and the shaft 2 is suppressed, and thus, a damage (wear) on the outer surface 2a of the shaft 2 can be suppressed. Here, the spring member 7 will be further described with reference to FIGS. 3 and 4.

Figure 3:
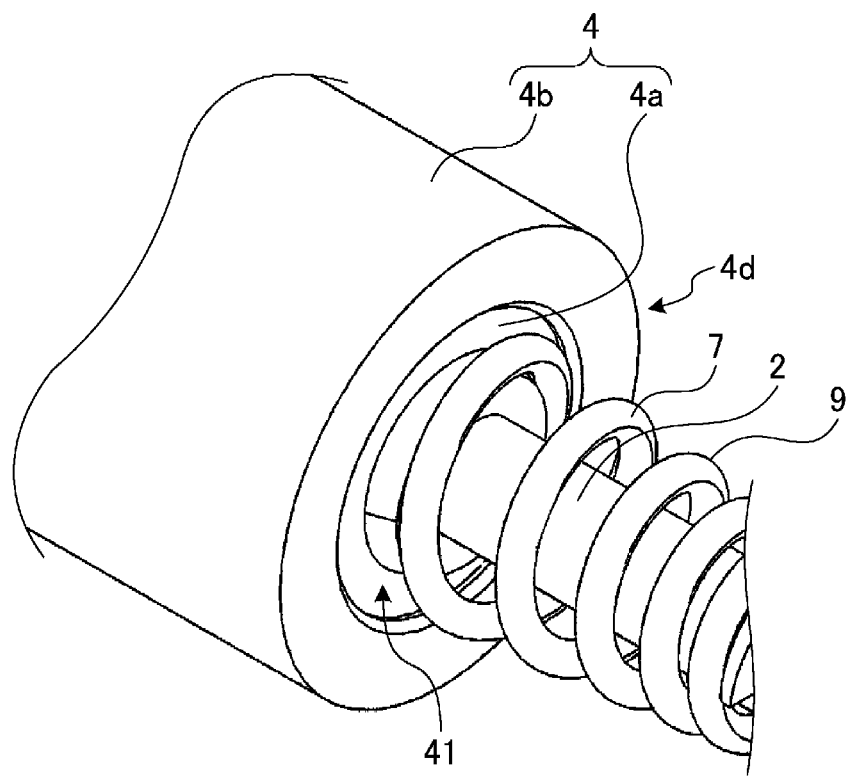
FIG. 3 is a perspective view of a rotor and a spring member according to the embodiment.
Figure 4:
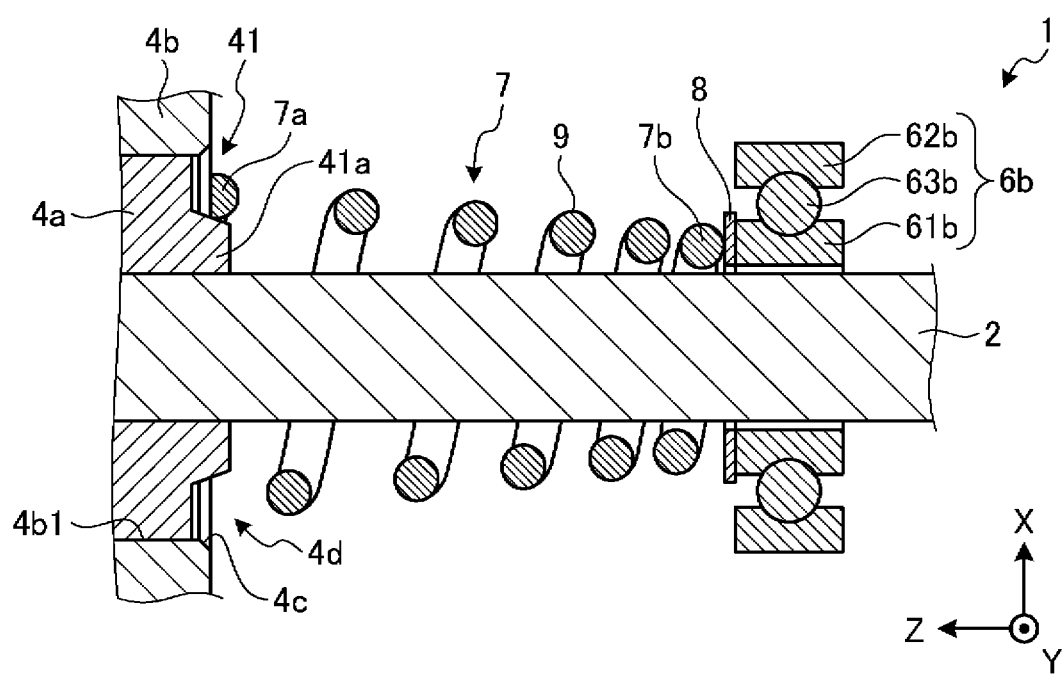
FIG. 4 is a cross-sectional view of a part of the motor according to the embodiment.

FIG. 3 is a perspective view of the rotor 4 and the spring member 7 according to the embodiment. FIG. 4 is a cross-sectional view of a part of the motor 1 according to the embodiment. In FIG. 3, a location where the rotor 4 and the spring member 7 are fixed is illustrated in an enlarged manner.

As illustrated in FIG. 3, a recess 41 is formed at an end portion surface 4d of the rotor 4 on a side of the spring member 7 (at a surface of the second end portion opposite to the spring member 7). The spring member 7 is fixed by the first end portion 7a (see FIG. 4) being fitted into the recess 41 of the rotor 4. Specifically, as illustrated in FIG. 3, the recess 41 is formed by the second end portion (an end portion on a side of the spring member 7) of the yoke 4a and the second end portion (an end portion on a side of the spring member 7) of the magnet 4b with different heights in the axial direction being combined, and in the radial direction, a step 4c is provided between the second end portion of the yoke 4a and the second end portion of the magnet 4b.

More specifically, as illustrated in FIG. 4, the yoke 4a of the rotor 4 includes a protrusion 41a protruding toward the spring member 7 located on the negative side in the Z-axis direction. Furthermore, the magnet 4b of the rotor 4 protrudes toward the spring member 7 with respect to a portion (a non-protrusion) other than the protrusion 41a in the yoke 4a. That is, the recess 41 is configured as a recess with the protrusion 41a of the yoke 4a and the inner circumferential part 4b1 of the magnet 4b serving as side walls, and the non-protrusion of the yoke 4a serving as a bottom surface.

Note that when the rotor 4 includes at least the protrusion 41a, the recess 41 may not be formed in the rotor 4. That is, the magnet 4b may not protrude with respect to the non-protrusion of the yoke 4a, for example, the end portion surface of the magnet 4b (a surface of the second end portion opposite to the spring member 7) and the end portion surface of the non-protrusion (a surface of the second end portion opposite to the spring member 7) may be aligned, and the end portion surface of the non-protrusion may be disposed closer to the spring member 7 than the end portion surface of the magnet 4b.

The spring member 7 is fixed to the rotor 4 with a portion of the protrusion 41a of the yoke 4a being disposed inside of the spring member 7 and the first end portion 7a being in contact with the protrusion 41a. Note that a positional relationship between the spring member 7 and the protrusion 41a will be described below in detail in FIG. 15.

Additionally, as illustrated in FIG. 4, the second bearing 6b includes an inner ring 61b, an outer ring 62b, and a ball part 63b. A predetermined gap is provided between the inner ring 61b and the shaft 2 in the radial direction. The inner ring 61b is displaceable or slidable with respect to the shaft 2, and a pressing force by the spring member 7 acts on the inner ring 61b. The inner ring 61b is in contact with the outer ring 62b via the ball part 63b due to the pressing force of the spring member 7, and is a portion configured to rotate while contacting with the rotating shaft 2. The outer ring 62b is a portion fixed to the bottom part 3b (see FIG. 2) of the housing 3. The ball part 63b includes a plurality of balls disposed in line in the radial direction of the shaft 2, and is disposed between the inner ring 61b and the outer ring 62b.

A second end portion 7b of the spring member 7 is connected to the inner ring 61b of the second bearing 6b via a resin member 8. The resin member 8 has a flat and annular plate shape and functions as an antiskid member for the spring member 7. As a result, the spring member 7 rotates in conjunction with a rotation of the shaft 2, the rotor 4, and the inner ring 61b. Note that the spring member 7 and the resin member 8 and the resin member 8 and the inner ring 61b may be fixed to each other with an adhesive member or the like.

Additionally, since the spring member 7 is disposed between the rotor 4 and the second bearing 6b, the spring member 7 presses the rotor 4 against the second bearing 6b in the axial direction. This enables the spring member 7 to apply a load or a preload on the second bearing 6b, and thus, even when vibration or the like of the vehicle propagates, the rotation of the shaft 2 can be stabilized because the inner ring 61b, the ball part 63b, and the outer ring 62b are in contact with one another due to the applied load or preload.

Figure 5:
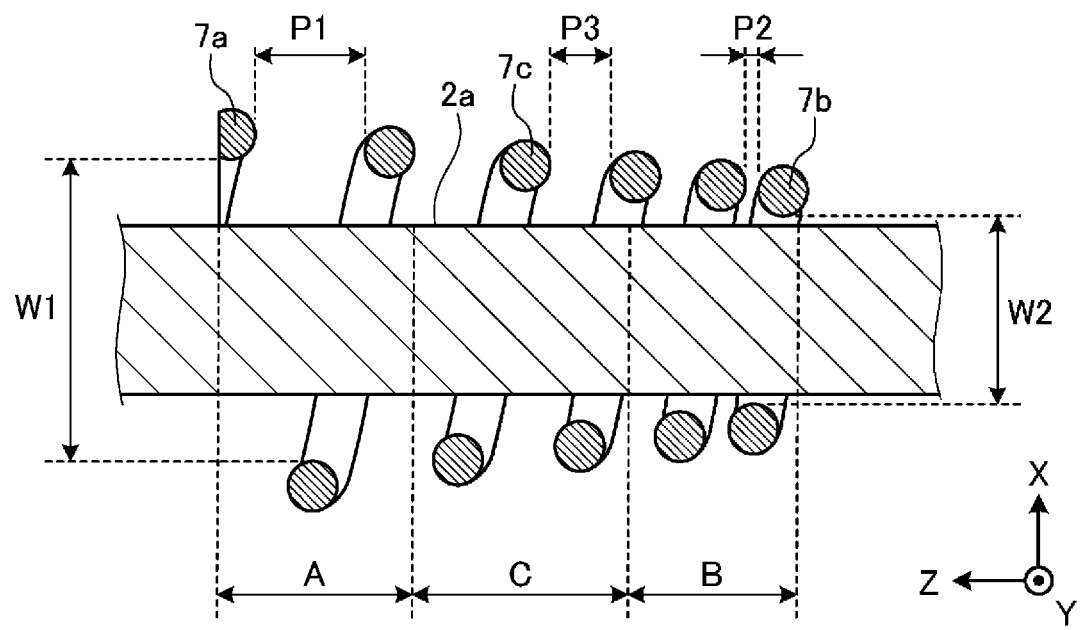
FIG. 5 is a cross-sectional view of the spring member according to the embodiment.

Furthermore, as illustrated in FIG. 4, the spring member 7 has a substantially conical shape and is configured to have an irregular pitch. Here, the shape of the spring member 7 will be described specifically with reference to FIG. 5. FIG. 5 is a cross-sectional view of the spring member 7 according to the embodiment.

As illustrated in FIG. 5, a gap is provided between the spring member 7 and the outer surface 2a of the shaft 2 in the radial direction. As a result, even if the spring member 7 swings in the radial direction of the shaft 2 due to vibration and the like of the vehicle, a contact between the spring member 7 and the shaft 2 can be suppressed, and thus, wear of the shaft 2 can be suppressed.

Furthermore, as illustrated in FIG. 5, in the spring member 7, a metal wire 9 is formed in a spiral shape along the outer surface of the shaft 2, and an outer diameter W1 of the spring member 7 on a side of the rotor 4, that is, the outer diameter W1 on the positive side in the Z-axis direction is greater than an outer diameter W2 of the spring member 7 on a side of the second bearing 6b, that is, the outer diameter W2 on the negative side in the Z-axis direction. Specifically, the spring member 7 has a substantially conical shape, and an outer diameter of the spring member 7 gradually increases from the second bearing 6b toward the rotor 4.

As a result, a center of radial vibration of the spring member 7 can be shifted toward the rotor 4. That is, since the center of vibration can be shifted to a position where the gap between the spring member 7 and the shaft 2 is wider, the contact between the spring member 7 and the shaft 2 can be further suppressed.

Furthermore, the spring member 7 is formed of at least one wire rod (the metal wire 9) wound in a spiral shape, and an interval (pitch) between a portion of the wound metal wire 9 and another portion is irregular in the axial direction. Specifically, in the spring member 7, a pitch P1 of the metal wire 9 on a side of the rotor 4 is longer than a pitch P2 of the metal wire 9 on a side of the second bearing 6b. More specifically, when an interval from one center to other center between the wires is measured toward the second end portion 7b on the side of the second bearing 6b starting from the first end portion 7a on the side of the rotor 4, the pitch of the metal wire 9 in the spring member 7 gradually shortens from the first end portion 7a on the side of the rotor 4 toward the second bearing 6b. In other words, the spring member 7 includes the first end portion 7a on the side of the rotor 4, the second end portion 7b on the side of the second bearing 6b, and a center part 7c between the first end portion 7a on the side of the rotor 4 and the second end portion 7b on the side of the second bearing 6b, in the axial direction. A wounding count N of the metal wire 9 forming the spring member 7 between the second end portion 7b on the side of the second bearing 6b and the center part 7c is greater than a wounding count M of the metal wire 9 forming the spring member 7 between the first end portion 7a on the side of the rotor and the center part 7c. Additionally, the winding count of the metal wire 9 gradually increases in the direction from the rotor 4 toward the second bearing 6b, in the axial direction. In other words, the spring member 7 is a spring having an irregular pitch so that the pitch of the metal wire 9 gradually decreases from the first end portion 7a toward the center part 7c, and then, toward the second end portion 7b to satisfy "P1>P3>P2".

As a result, in a case where vibration in the axial direction of the shaft 2 being the Z-axis direction propagates to the motor 1, a frequency of the vibration propagating through the spring member 7 is different between (between the pitches of) the metal wire 9 of the spring member 7 on the side of the rotor 4 and the metal wire of the spring member 7 on the side of the second bearing 6b, and thus, the spring member 7 is less likely to resonate, resulting in suppression of the generation of surging. In addition, since the spring member 7 is less likely to generate the surging, a radial amplitude of the spring member 7 can be further suppressed by shifting the center of the vibration toward the rotor 4.

Figure 6:
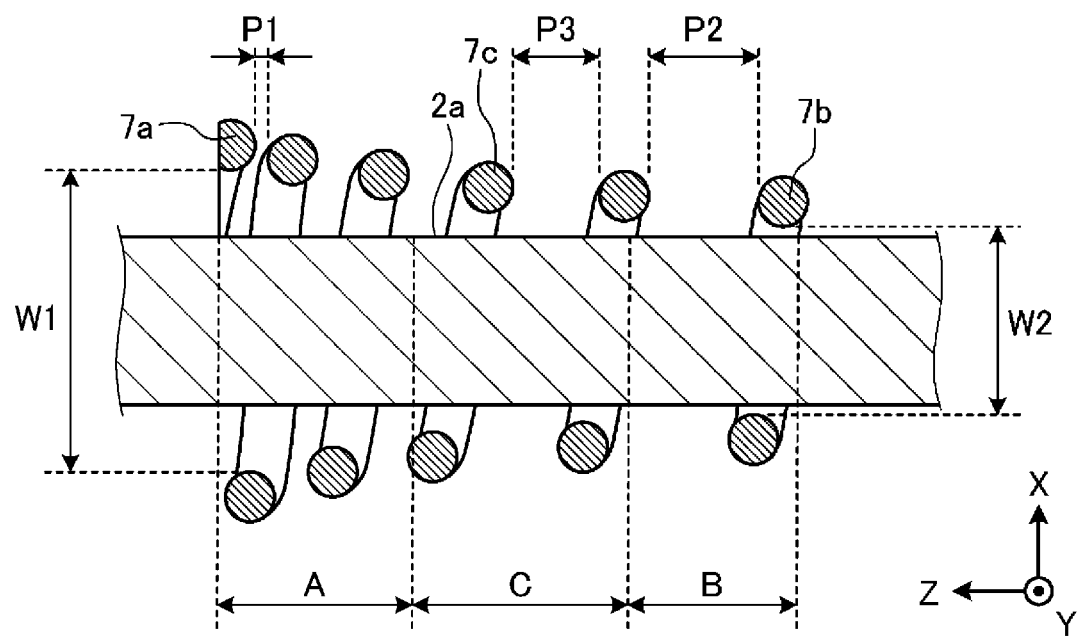
FIG. 6 is a diagram illustrating a spring member having an irregular pitch different from the spring member illustrated in FIG. 5.
Figure 7:
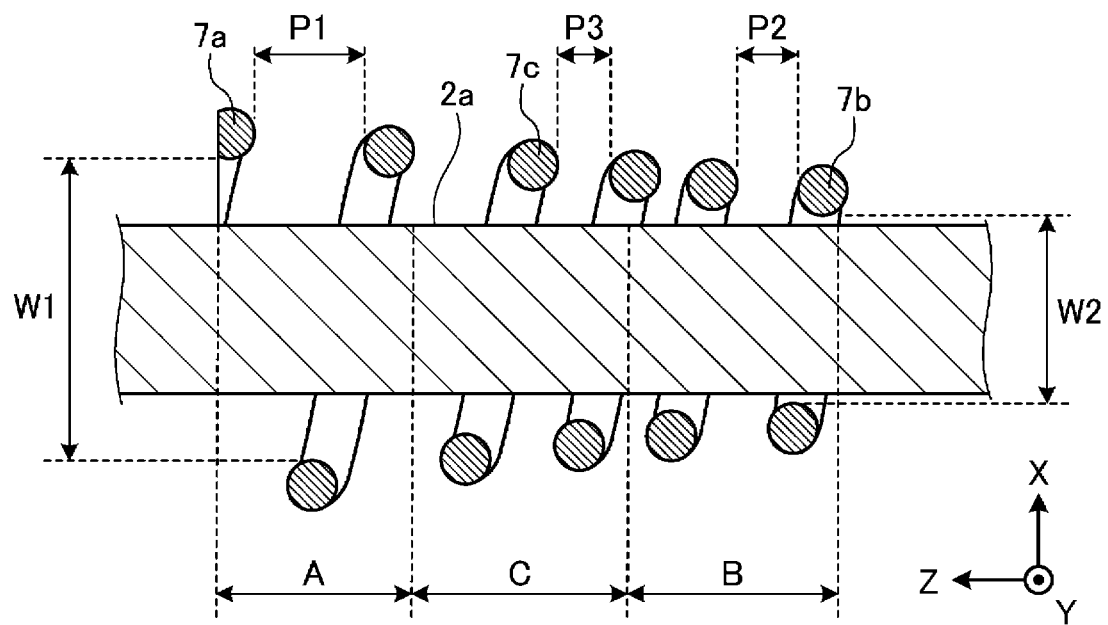
FIG. 7 is a diagram illustrating a spring member having an irregular pitch different from the spring member illustrated in FIG. 5.
Figure 8:
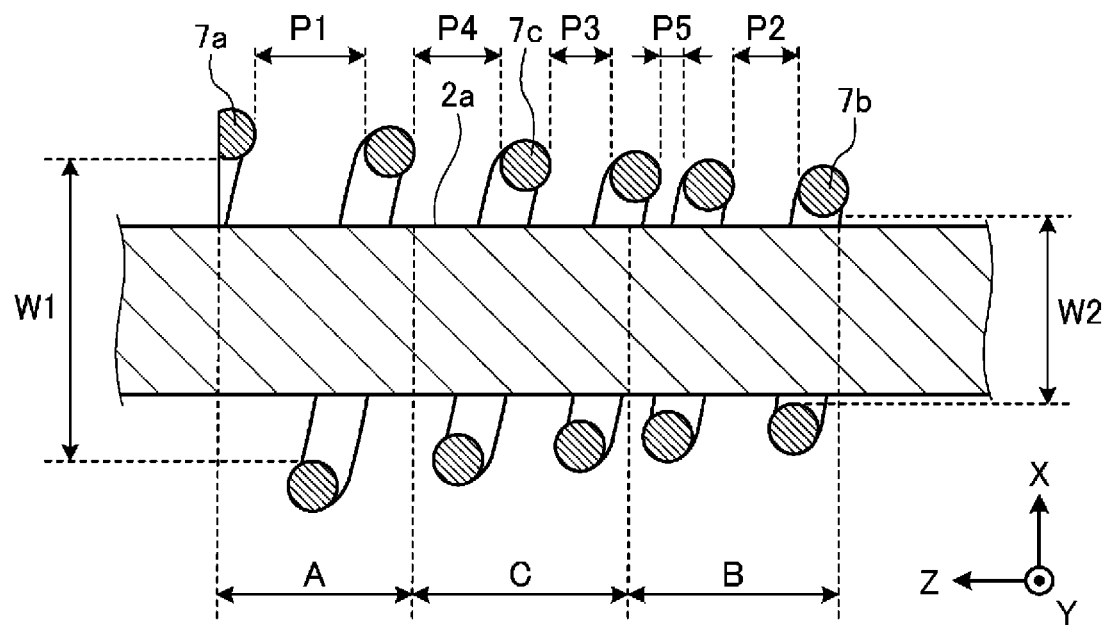
FIG. 8 is a diagram illustrating a spring member having an irregular pitch different from the spring member illustrated in FIG. 5.

Note that the spring member 7 is not limited to the spring having an irregular pitch so that the pitch of the metal wire 9 gradually decreases from the rotor 4 toward the second bearing 6b. FIGS. 6 to 8 are diagrams each illustrating a spring member having an irregular pitch different from the spring member illustrated in FIG. 5. For example, in the spring member 7, the pitch P1 of the metal wire 9 on the side of the rotor 4 may be shorter than the pitch P2 of the metal wire 9 on the side of the second bearing 6b. More specifically, as illustrated in FIG. 6, the spring member 7 may be a spring having an irregular pitch so that the pitch of the metal wire 9 gradually increases from the first end portion 7a toward the center part 7c, and then, toward the second end portion 7b to satisfy "P1<P3<P2". Furthermore, (1) The pitch of the metal wire 9 on the side of the rotor 4, the pitch of the metal wire 9 on the side of the second bearing 6b, and the pitch of the metal wire 9 between the metal wire 9 on the side of the rotor 4 and the metal wire 9 on the side of the second bearing 6b (on a side of the center part 7c) may be different from one another, for example. In other words, for example, a pitch in a region A, a pitch in a region B, and a pitch in a region C illustrated in FIG. 5 may be different from one another. (2) The pitch of the metal wire 9 on the side of the rotor 4 may be different from the pitch of the metal wire 9 on the side of the second bearing 6b and the pitch of the metal wire 9 on the side of the center part 7c, and the pitch of the metal wire 9 on the side of the second bearing 6b and the pitch of the metal wire 9 on the side of the center part 7c are the same pitch. That is, the pitch in the region B and the pitch in the region C may be the same, and the pitch in the region A may be different from the pitch in the regions B and C. (3) The pitch of the metal wire 9 on the side of the second bearing 6b may be different from the pitch of the metal wire 9 on the side of the rotor 4 and the pitch of the metal wire 9 on the side of the center part 7c, and the pitch of the metal wire 9 on the side of the rotor 4 and the pitch of the metal wire 9 on the side of the center part 7c are the same pitch. That is, the pitch in the region A and the pitch in the region C may be the same, and the pitch in the region B may be different from the pitch in the regions A and C. (4) The pitch of the metal wire 9 on the side of the center part 7c may be different from the pitch of the metal wire 9 on the side of the rotor 4 and the pitch of the metal wire 9 on the side of the second bearing 6b, and the pitch of the metal wire 9 on the side of the rotor 4 and the pitch of the metal wire 9 on the side of the second bearing 6b are the same pitch. That is, the pitch in the region A and the pitch in the region B may be the same, and the pitch in the region C may be different from the pitch in the regions A and B. (5) Each pitch of the metal wire may be set so as to change discontinuously in the axial direction. For example, as illustrated in FIG. 7, the spring member 7 may be a spring having an irregular pitch discontinuously changing to satisfy "P1>P2>P3" so that the pitch of the metal wire 9 becomes shorter from the first end portion 7a toward the center part 7c to satisfy "P1>P3", and the pitch of the metal wire 9 becomes longer from the center part 7c toward the second end portion 7b to satisfy "P3<P2". In addition, for example, as illustrated in FIG. 8, the spring member 7 may be a spring having an irregular pitch discontinuously changing to satisfy "P1>P4>P2>P3>P5" so that the pitch of the metal wire 9 changes from the rotor 4 toward the second bearing 6b to satisfy "P1>P4>P3>P5<P2". A discontinuous irregular pitch as illustrated in FIG. 8 is obtained by designing the spring member 7 to satisfy "P4=(N−1)×C, P3=(N−3)×C, P5=(N−4)×C, P2=(N−2)×C" in a case of "P1=N×C" where N is an integer, and C is a constant. Alternatively, the discontinuity illustrated in FIG. 8, for example, the discontinuous irregular pitch as illustrated in FIG. 8 is obtained, for example, by designing the spring member 7 to satisfy "P4=(N−1)×C, P3=(N−2.5)>C, P5=(N−3.5)×C, P2=(N−1.5)×C" in a case of "P1=N×C", for example. (6) If the pitches of the metal wires differ from one another, any pitch can be set.

Figure 9:
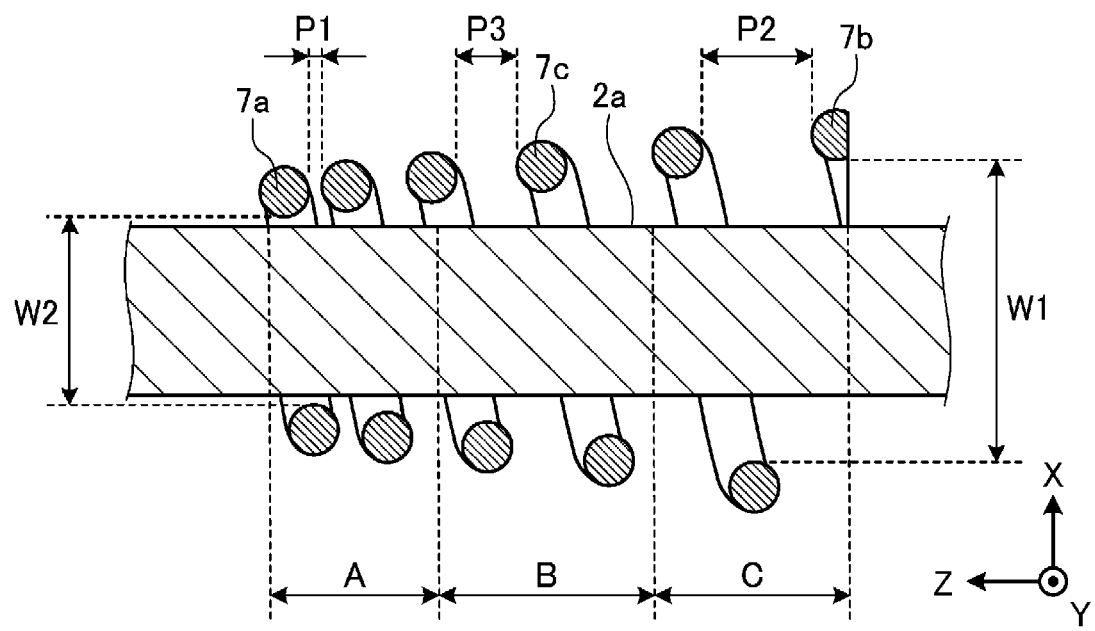
FIG. 9 is a diagram illustrating a modification of the spring member.
Figure 10:
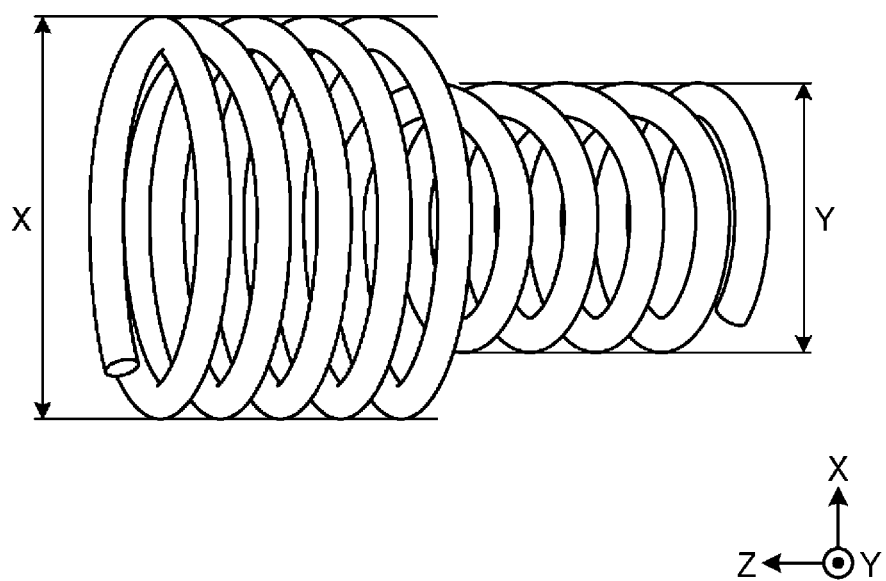
FIG. 10 is a diagram illustrating a modification of the spring member.
Figure 11:
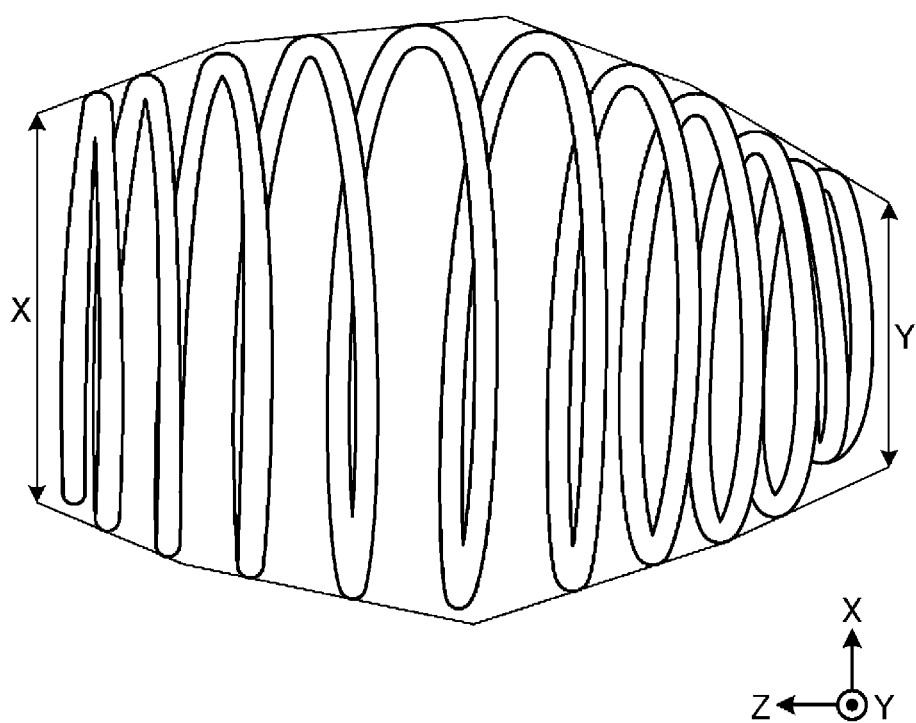
FIG. 11 is a diagram illustrating a modification of the spring member.

In addition, in the example illustrated in FIG. 5, the spring member 7 has a substantially conical shape having the outer diameter decreasing from the first end portion 7a toward the second end portion 7b; however, the spring member 7 is not limited to this shape. FIGS. 9, 10, and 11 are diagrams illustrating modifications of the spring member. For example, as illustrated in FIG. 9, the spring member 7 may have a substantially conical shape having the outer diameter increasing from the first end portion 7a toward the second end portion 7b. Note that FIG. 9 illustrates the spring member 7 having an irregular pitch so that the pitch of the metal wire 9 gradually increases from the first end portion 7a toward the center part 7c, and then, toward the second end portion 7b to satisfy "P1<P3<P2". Furthermore, the shape of the spring member 7 is not limited to the substantially conical shape. For example, as illustrated in FIG. 10, the spring member 7 may have a stepped shape having the outer diameter changing in a stepwise manner from the second bearing 6b toward the rotor 4 (in a negative direction opposite the Z-axis direction). FIG. 10 illustrates the spring member 7 having an outer diameter X of a first-stage spring on the positive side in the Z-axis direction greater than an outer diameter Y of a second-stage spring on the negative side in the Z-axis direction. Alternatively, as illustrated in FIG. 11, the spring member 7 may be a so-called barrel-shaped spring member having the longest outer diameter at the center in the axial direction and having the outer diameter gradually decreasing toward the end portions (the first end portion 7a and the second end portion 7b) (in a positive direction along the Z-axis direction and a negative direction opposite the Z-axis direction). FIG. 11 illustrates the barrel-shaped spring member 7 having the outer diameter X of the end portion on the positive side in the Z-axis direction greater than the outer diameter Y of the end portion on the negative side in the Z-axis direction. That is, a freely-selected shape may be employed on the spring member 7 as long as a gap between the spring member 7 and the shaft 2 can be ensured.

Figure 12:
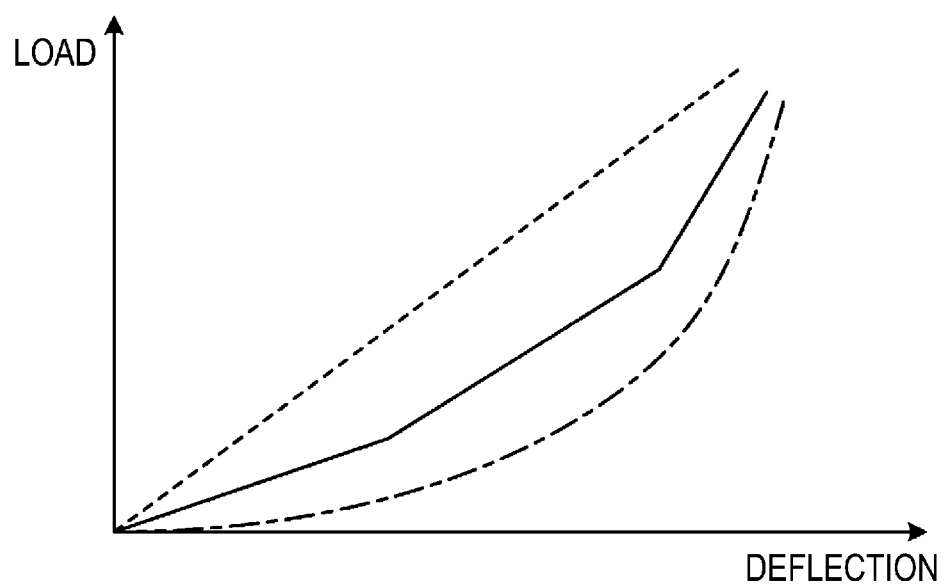
FIG. 12 is a graph showing another modification of the spring member.
Figure 13:
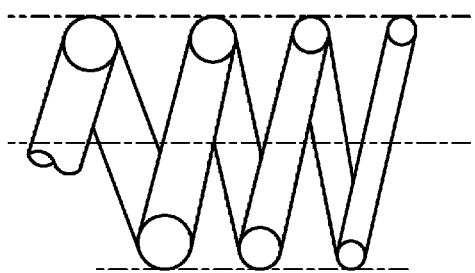
FIG. 13 is a diagram illustrating another modification of the spring member.
Figure 14:
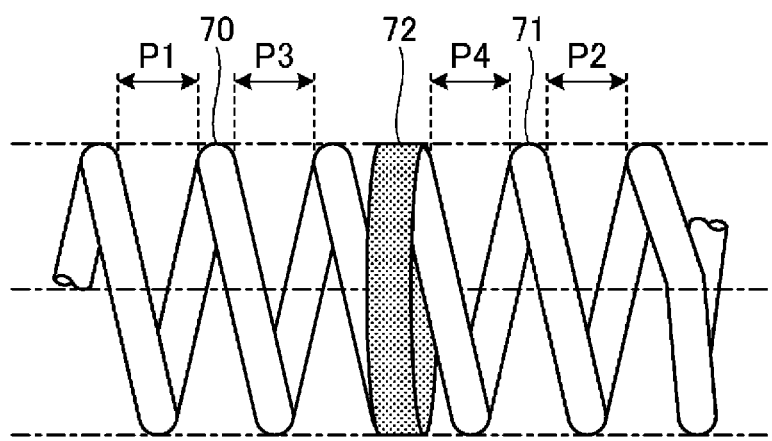
FIG. 14 is a diagram illustrating another modification of the spring member.

Furthermore, the spring member 7 is not limited to the irregular pitch spring or the conical spring. FIG. 12 is a graph showing another modification of the spring member, and FIGS. 13 and 14 are diagrams each illustrating the same. From the perspective of suppressing the occurrence of surging, as shown in FIG. 12, the spring member 7 is only required to be a nonlinear spring not having a direct proportional relationship between a load and a deflection (displacement amount) of the spring. In FIG. 12, a load characteristic of a linear spring is indicated by a dotted line, and an example of the load characteristic of the nonlinear spring is indicated by a solid line and a dot-dash line. The above-described irregular pitch spring, conical spring, stepped spring, barrel-shaped spring, and the like are examples of the nonlinear spring.

For example, as illustrated in FIG. 13, the spring member 7 may be a tapered spring having a constant outer diameter but having different wire diameters. Alternatively, the spring member 7 may be a nonlinear spring obtained by combining springs having different spring constants. For example, as illustrated in FIG. 14, the spring member 7 may be a spring having a constant outer diameter and a regular pitch, but a spring obtained by joining a spring 70 having a good toughness and a spring 71 having a good repulsive force, with a rubber ring 72 serving as a coupling member. The spring 70 and the spring 71 can be produced by annealing methods different from each other. Note that the spring member 7 may be a spring obtained by integrating the spring 70 having a good toughness and the spring 71 having a good repulsive force without the rubber ring 72. Alternatively, the spring member 7 may be a nonlinear spring obtained by combining springs having pitches P3 and P4 different from pitches P1 and P2, as illustrated in FIG. 14.

Note that in FIG. 5 and the like, the description is given for a case of the spring member 7 having an irregular pitch, but the spring member 7 may have approximately the same pitch, that is, a regular pitch. That is, as long as the first end portion 7a of the spring member 7 is fixed to the rotor 4 to sufficiently suppress the generation of the surging, the spring member 7a may be a linear spring.

Figure 15:
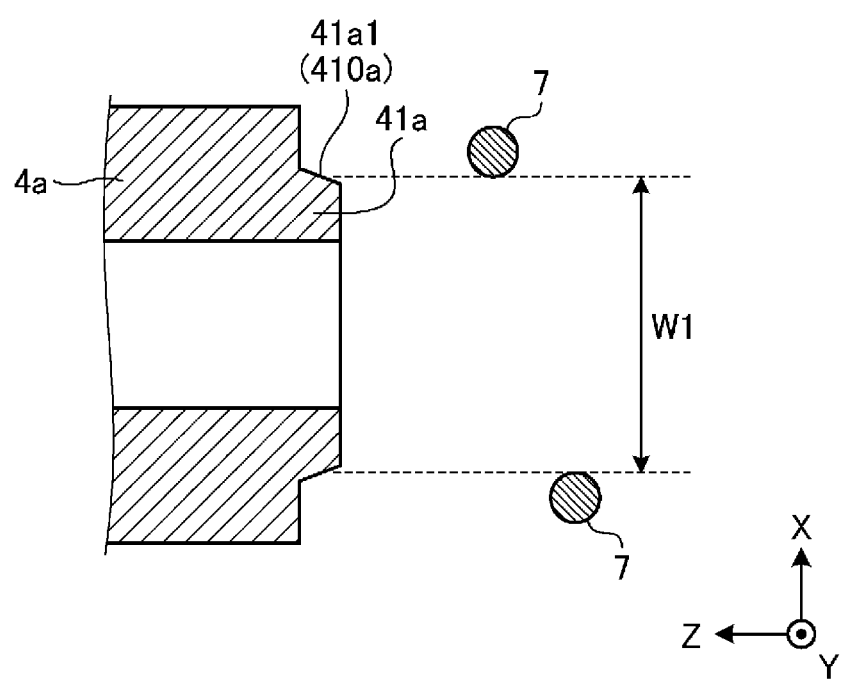
FIG. 15 is a diagram for describing a positional relationship between the rotor and the spring member according to the embodiment.

Next, a positional relationship between the protrusion 41a of the rotor 4 and the spring member 7 will be described with reference to FIG. 15. FIG. 15 is a diagram for describing the positional relationship between the rotor 4 and the spring member 7 according to the embodiment.

In the axial direction, the protrusion 41a has a shape tapering toward the spring member 7, an outer surface 41a1 of the protrusion 41a has an inclined surface, and the first end portion 7a of the spring member 7 is fixed to the inclined surface. Specifically, as illustrated in FIG. 15, the protrusion 41a includes an inclined surface 410a tapering toward the spring member 7. The first end portion 7a of the spring member 7 is fixed to the inclined surface 410a. In other words, the inclined surface 410a is at a position corresponding to the outer diameter W1 at the first end portion 7a of the spring member 7.

That is, when the protrusion 41a is formed into a tapered shape by forming the inclined surface 410a, the protrusion 41a fits into the spring member 7. As a result, the spring member 7 and the protrusion 41a can be physically fixed to each other.

Accordingly, an adhesive member is not required to fix the spring member 7 and the protrusion 41a, and thus, an axial displacement of a rotation due to the adhesive member can be prevented. Furthermore, the spring member 7 is automatically aligned by the protrusion 41a fitting into the spring member 7, and thus, vibration of the spring member 7 due to vibration or the like of the vehicle can be suppressed.

Figure 16:
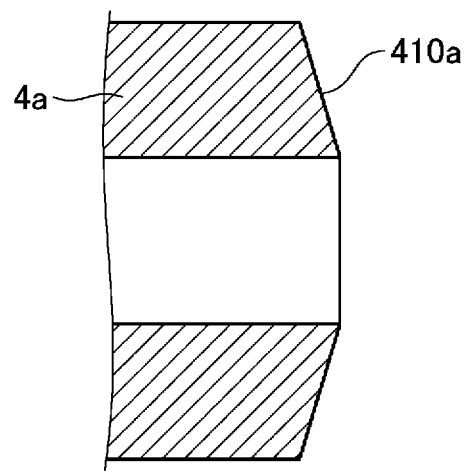
FIG. 16 is a cross-sectional view of a yoke according to a modification.

Note that in the present embodiment, the description is given for the case where the protrusion 41a has a stepped shape having a portion of the end portion surface of the yoke 4a being formed as the inclined surface 410a; however, the present embodiment is not limited to the case, and for example, as illustrated in FIG. 16, the entire end portion surface of the yoke 4a may be formed as the inclined surface 410a.

FIG. 16 is a cross-sectional view of the yoke 4a according to a modification. As illustrated in FIG. 16, the yoke 4a according to the modification includes the inclined surface 410a, and the entire end portion surface on a side of the rotor 4 tapers toward the rotor 4. This allows the yoke 4a to accommodate the spring member 7 having any outer diameter W1.

As described above, the motor 1 according to the embodiment includes the shaft 2 serving as the rotation axis, the rotor 4, the bearing 6, and the spring member 7. The rotor 4 is fixed to the shaft 2. The bearing 6 is disposed opposite to the rotor 4 in the rotation axis direction and rotatably supports the shaft 2. The spring member 7 is disposed between the rotor 4 and the bearing 6, and the first end portion 7a of the spring member 7 is fixed to the rotor 4. As a result, the wear of the shaft 2 can be suppressed.

Figure 17:
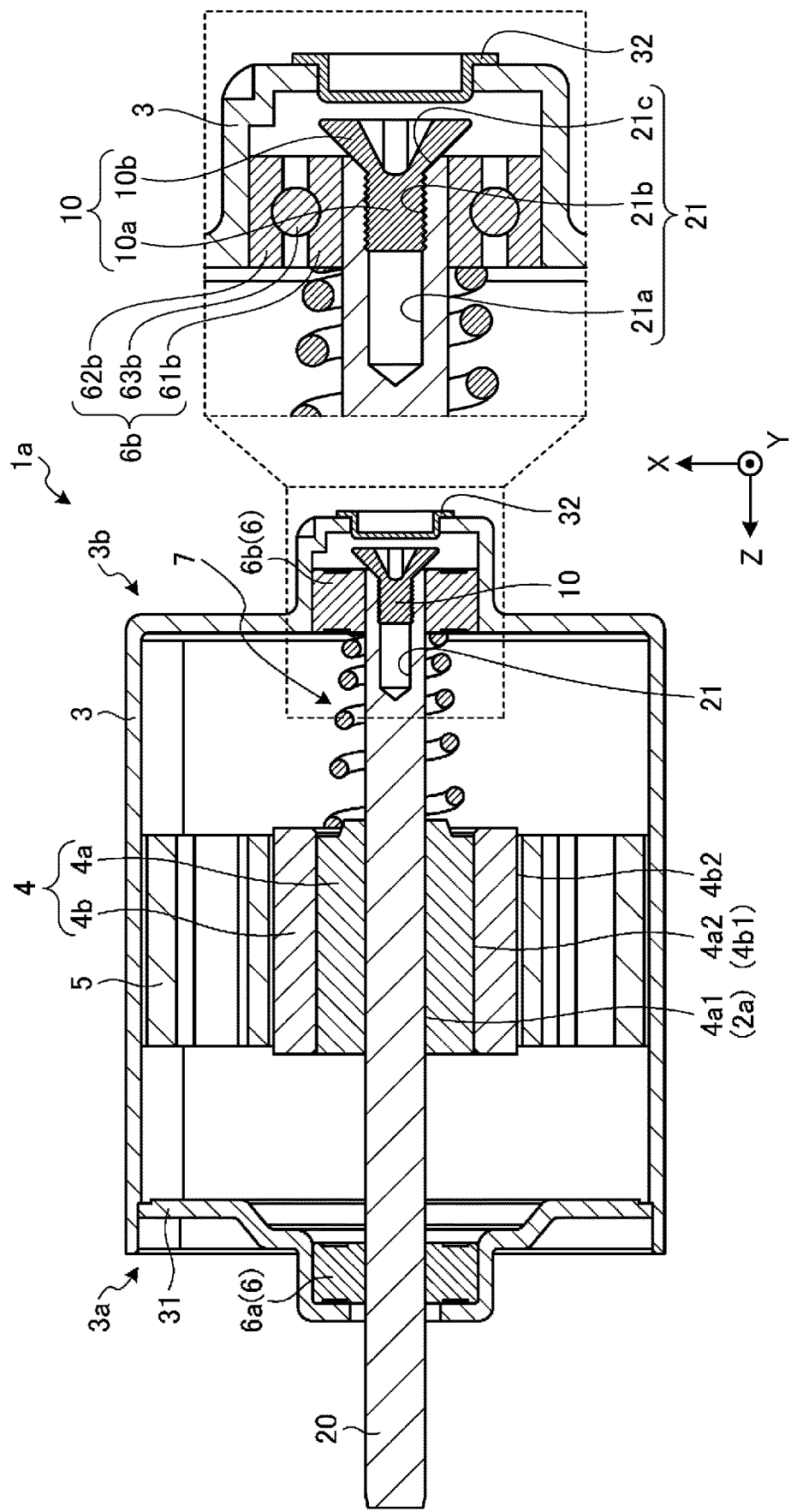
FIG. 17 is a cross-sectional view of a motor according to a modification.

Here, as described above, in the motor 1, the shaft 2 is displaceably or slidably inserted into the inner ring 61b of the second bearing 6b. Thus, when sine wave or random wave vibration is applied to the motor 1, in addition to friction between the spring member and the shaft 2 due to the generation of the surging, friction between the inner ring 61b and the shaft 2 occurs. A metal powder produced by such friction also reduces a rotational efficiency of the shaft 2. In the following, a motor configured such that the shaft 2 is substantially press-fitted into the inner ring 61b from a state that the shaft 2 is loosely fitted into the inner ring 61b so that wobbling is prevented is described with reference to FIG. 17. FIG. 17 is a cross-sectional view of a motor according to a modification. Note that in a motor 1a illustrated in FIG. 17, the same reference signs are assigned to the same parts as those in the motor 1 illustrated in FIG. 2, and the descriptions will be omitted.

In the motor 1a, a portion of a shaft 20 on the positive side in the Z-axis direction protrudes from a lid part 32, and corresponds to an output side to be connected to a power transmission mechanism such as a gear. In addition, a portion of the shaft 20 on the negative side in the Z-axis direction corresponds to a counter-output side and is accommodated inside the bottom part 3b of the housing 3. An opening of the bottom part 3b is covered by the second lid part 32. Furthermore, the motor 1a according to the modification illustrated in FIG. 17 differs from the motor 1 according to the embodiment illustrated in FIG. 2 in that instead of the shaft 2, a screw 10 and the shaft 20 are provided. Such a feature will be mainly described below.

The screw 10 includes a screw part 10a and a head part 10b. The head part 10b has a shape having a flat upper surface and a seat surface in a conical shape. That is, the screw 10 illustrated in FIG. 17 is a countersunk head screw. A cross hole, for example, is formed in a top surface of the head part 10b. A hole for inserting the screw 10 is formed on the counter-output side of the shaft 20. A hole part 21 of the shaft 20 is an inner wall surface forming the hole. The hole part 21 includes a tubular part 21a forming a tubular hole, a female screw part 21b grooved to receive the screw part 10a being a male screw, and a tapered surface part 21c having an inclination conforming to an inclination of the seat surface of the head part 10b. A dimension of the head part 10b in a Z direction is greater than a dimension of the tapered surface part 21c in the Z direction.

After the shaft 20 is inserted into the second bearing 6b, when the screw 10 is screwed into the hole by a driver or the like, the seat surface of the head part 10b pushed in the positive direction along the Z-axis direction abuts against the tapered surface part 20c, and as a result, the tapered surface part 20c is pressed and expanded outward in the radial direction of the shaft 20. As a result, the tapered surface part 20c increases in size so that the outer diameter of the shaft 20 increases, and a gap between the shaft 2 and the inner ring 61b gradually narrows. This results in a state where the shaft 2 is press-fitted into the inner ring 61b. The degree of fit can be adjusted by a screwed amount of the screw 10. As a result, friction between the inner ring 61b and the shaft 2 due to vibration is less likely to occur, and thus, the generation of an abrasion powder in the second bearing 6b can be suppressed. Note that in the present modification, the shaft 20 is press-fitted into the first bearing 6a and the second bearing 6b, and thus, the second bearing 6b (inner ring 61b) is preloaded. Thus, in the present modification, the spring member 7 need not be provided as long as the state where the second bearing 6b (inner ring 61b) is preloaded can be maintained.

The present invention is not limited to the embodiments described above. An embodiment appropriately combined with the above components is included in the present invention. Further effects and modifications can be readily derived by a person skilled in the art. Thus, broader aspects of the present invention are not limited to the embodiments described above, and various modifications are possible.

REFERENCE SIGNS LIST

1 Motor 2 Shaft 3 Housing 4 Rotor 4a Yoke 4b Magnet 5 Stator 6 Bearing 6a First bearing 6b Second bearing 7 Spring member 8 Resin member 9 Metal wire 31 Lid part

The invention claimed is:

1. A motor comprising:
a shaft as a rotation axis;
a rotor fixed to the shaft;
a bearing disposed opposite to the rotor in a direction of the rotation axis and configured to rotatably support the shaft; and
a spring member disposed between the rotor and the bearing and including a first end portion fixed to the rotor,
the spring member is wound in a spiral shape along an outer surface of the shaft, being formed of a wound wire rod,
an outer diameter of the spring member on a side of the rotor is greater than an outer diameter on a side of the bearing,
a pitch of the spring member is irregular, and
a pitch of the spring member on a side of the rotor is longer than a pitch of the spring member on a side of the bearing.

2. The motor according to claim 1, wherein
the rotor includes:
a magnetic member, and
a magnet,
the magnetic member includes a protrusion protruding toward the spring member in the direction of the rotation axis, and
a portion of the protrusion is disposed inside the spring member.

3. The motor according to claim 2, wherein
in the direction of the rotation axis, the protrusion has a shape tapering toward the spring member,
an outer surface of the protrusion includes an inclined surface, and
the first end portion of the spring member is fixed to the inclined surface.

4. The motor according to claim 1, wherein
in the direction of the rotation axis, the spring member presses the rotor against the bearing.

5. The motor according to claim 1, wherein
a gap is provided between the spring member and the outer surface of the shaft in a radial direction.

6. The motor according to claim 1, wherein
a pitch of the wound wire rod is irregular in the direction of the rotation axis, and
a pitch of the wound wire rod on a side of the rotor is longer than a pitch of the wound wire rod on a side of the bearing.

7. The motor according to claim 1, comprising,
a stator including coils and plate-like metal members,
the rotor includes a magnet, and
the plate-like metal members are stacked in the direction of the rotation axis.

* * * * *